Patented June 4, 1940

2,202,849

UNITED STATES PATENT OFFICE 2,202,849

RESINS, GUMS, AND BALSAMS

Rudolph R. Grant, Dayton, Ohio, assignor of one-fourth to Max Isaacson, Dayton, Ohio, and one-fourth to Sol Shappirio, Washington, D. C.

No Drawing. Application August 22, 1935, Serial No. 37,397

19 Claims. (Cl. 260—398)

This invention relates to resinous reaction products, including also products of the character of gums, balsams and pitches from glyceride oils, and to the methods of producing such products, as well as utilization of such products.

In the prior art, glyceride oils have been utilized in the production of resinous type reaction products. The production of resinous products of substantial hardness from such glyceride oils, or the acids of such oils in the prior art, has generally involved the presence of other organic substances, particularly polybasic acids, etc., as in the production of the phthalic glyceride types of resins, or of other added organic components. Rather complex reactions are thus involved in the production of such resins by prior art procedures, and also the cost of such resins has been materially increased due to the necessity for inclusion of other organic components.

Among the objects of the present invention is the production of resin type reaction products from the glyceride oils or the acids of the glyceride oils, without requiring the inclusion of other organic components in the production of such reaction products.

Other objects include the production of resinous reaction products of novel characteristics by simple methods and inexpensive procedures.

Still further objects and advantages will appear from the more detailed description given below, it being understood, however, that this more detailed description is given by way of explanation and illustration only, and not by way of limitation, since various changes therein may be made by those skilled in the art without departing from the spirit and scope of the present invention.

In accordance with the present invention, the glyceride oils, or the acids from such glyceride oils, either individually or in admixture, are heat treated in the presence of an oxide of an alkaline earth metal, or an oxide of magnesium, until the desired reaction product is obtained. Elevated temperatures are required in producing such reaction products.

The glyceride oils that may be employed include both animal and vegetable oils, or from another point of view or classification, the drying, semi-drying, and non-drying oils may be utilized. The oils may be in their usual commercial forms, or refined, virgin, blown, boiled, heat treated oils may be employed. The acids of such blown or heat treated oils, and in general the acids of the various classes of oils referred to may be employed in producing these condensation products. It will be understood that each and every oil does not give identically the same type of reaction products, but the reaction products obtained from these various oils fall into the general classes of resin-type reaction products, the characteristics of which may be modified over a wide range, as more particularly pointed out below, to give products which are resins, gums, balsams, or pitches, etc. As illustrative of these various oils that may be employed, particular attention may be called to linseed, tung, fish, whale, rape, perilla, soya bean, sun flower, corn, cottonseed and castor oils, as well as the fatty acids derived therefrom. Among the fatty acids derived from such oils may be particularly mentioned linoleic, ricinoleic, isolinolenic, linolenic, eleostearic, etc. acids. These individual acids may be used for the production of reaction products in accordance with the present invention, or the mixtures of acids derived by saponification of the oils, or synthetic mixtures of these acids may be employed in producing the reaction products.

Of the metallic oxides employed in producing these reaction products, magnesia or magnesium oxide gives unique type reaction products, and of better character than that obtained from the oxides of the alkaline earth metals. The oxides employed in the process should be substantially free from moisture, and where such oxides, such as those of magnesium and calcium are employed, they should be substantially free from carbonates, and where such oxides are produced by calcination of natural products like magnesite or lime stone, etc., the products should for best results be substantially calcined to remove the presence of carbonates and carbon dioxide. Substantial amounts of the oxides are utilized in producing the reaction products in accordance with the present invention, but it has been found that variation in the amount of oxide employed will control the character of reaction product to be obtained with a particular oil or fatty acid. Thus as illustrated in the examples given below, resin-type reaction products are obtained by utilizing indicated proportions of the oxides for a given oil. Materially reducing the amount of oxides employed below that required in the production of the resinous type product from the oils or higher fatty acids, results in producing a gum-type material. Further reduction in the amount of oxides employed below that required for the production of gums, but still utilizing substantial amount of the oxides, results in the production of balsam-type products. Still further reduction in the amount of oxides, but still employing substantial amounts of such oxides, results in the production of pitch-like products. In carrying out the reactions, the oxides of whatever character employed, are desirably throughly intermixed with the oil before the heat treatment, and certainly before the final stages of the heat treatment, so that the reaction will proceed vigorously and thoroughly throughout the reaction mass.

The heavy oxide of magnesium, substantially free from carbonates, has given the best results in producing these reaction products, although calcium oxide and mixtures of calcium and magnesium oxide, such as in equal parts, may also be utilized, although as noted, the oxide should be substantially free from moisture or carbonic acid and its compounds. The best types of resinous products are obtained when carbonic acid or its derivatives are absent, and such derivatives appear to retard the process and prevent the full resin reaction. Where balsams, for example, are produced, a good calcined lime of the commercial type can be used, and particularly where such commercial product is a mixture of the oxides of calcium and magnesium, but will not make as hard a resin generally speaking as magnesia alone.

The mixture of desired ingredients is heat treated to produce the reaction products, and in such heat treatments, the most desirable method has been found to involve heating the mixture of desired ingredients quite rapidly until gas in substantial amount is evolved. At this point, external heating is discontinued, and the reaction permitted to proceed spontaneously and exothermically, which it does quite vigorously giving off large volumes or dense clouds of gas, usually of obnoxious character, and which in some instances are inflammable. At the start of the spontaneous or exothermic reaction, a change in character and odor of gas given off may be noted. Usually reaction for from 5 to 10 minutes during the exothermic stage of reaction is sufficient to give the desired reaction product. While the reaction may be carried out in open vessels, exclusion of air will generally give lighter colored products; but it will be apparent that when the vigorous, spontaneous and exothermic reaction begins, dense clouds of gases and vapors are evolved which tend to sweep out any oxygen from the reaction vessel. Rapid heating up to this point of exothermic reaction is desirable, although the oils exhibit different capacities for absorption of the heat, and with an oil like castor oil, the application of heat is somewhat slower than with the other oils. In those cases where there is any tendency to flashing, as in connection with linseed oil during the heating-up stage, a loose cover may be applied over the heating vessel to keep the air out as far as possible. The reaction is so vigorous that when open vessels are employed, it is desirable to have the heating chamber of a capacity about four times the quantity of mixture being treated, so that the oil mixture will not be carried out of the heating chamber. Where the gases and vapors from the reaction vessel are permitted to escape into the air, it is desirable first to treat them with water, as by means of a water spray to absorb most of the odor, then permitting the gases and vapors to pass to the atmosphere. The water spray if of low enough temperature will condense, condensible matter from the gases and vapors, or a condenser may be employed for that purpose.

In producing the resinous type condensation products or polymerization products, an excess of oxide is not disadvantageous, since any oxide apparent in the material may be readily removed therefrom while the resin is in the fluid stage. It has also been found desirable to permit the reaction to proceed in the presence of reaction products produced in a previous run, and the residues of reaction products that remain in the reaction vessel may be employed for that purpose.

To some extent, the amount or quantity of oxide employed will vary with variations in the grade of oil employed.

The following specific examples will illustrate the production of reaction products in accordance with the present invention.

I. A castor oil resin may be prepared as follows. Approximately 1 lb. of magnesium oxide is used to 14 lbs. of oil. The castor oil reaction begins at temperatures of approximately 510 to 520° F. The mixture of oil and oxide, utilizing magnesium oxide particularly for this purpose, is heated rapidly until a temperature of about 520° F. is obtained. The external heat is then cut off as reaction gas begins to be emitted, and the reaction is permitted to proceed under its own heat. The temperature rises quite rapidly to 560 to 590° F. depending on the character of reaction vessel, radiation of heat, etc. The spontaneous or exothermic reaction is permitted to run for from 5 to 10 minutes, at the end of which time, a product is obtained which on cooling produces a rather brittle, mediumly dark colored brownish mass, translucent in thin layers with a greenish cast.

II. Similarly a tung oil reaction product may be utilized using the same proportions as that given above for magnesium oxide, namely about 1 lb. of magnesium oxide to 14 lbs. of tung oil. The tung oil reaction in the exothermic stage usually proceeds between temperatures of about 530 to 560° F. The mass is heated up rapidly until the reaction takes place, which will generally be evidenced at about 540°, and then permitted to proceed exothermically as indicated above. More care is required in handling tung oil than in some of the other oils, and while rapid heating is best, the heat cannot be applied as fast as in the case of castor oil.

It is noteworthy that the tung oil does not gelatinize during this treatment. The tung oil product is a quite brittle resin, easily powdered or ground, having a color and appearance quite similar to that of ordinary shellac.

III. A linseed oil resin may similarly be produced from linseed oil, together with the same proportion of magnesium oxide as that indicated above for castor oil. The reaction usually begins at about 560° F., and during the exothermic reaction after the external heat has been cut off, may reach a temperature of 680° F. In view of the tendency of the oil to flash, while rapid heating is employed, care should be utilized. The heating vessel may in this instance be covered to keep out air as far as possible. The linseed oil resin is a quite brittle, translucent, ready to grind product.

The following examples particularly illustrate the use of the edible oils in the production of resins.

IV. A resin may be produced from soya bean oil, handling the oil in much the same manner as that described above for castor oil. The reaction temperature for exothermic reaction begins about 540° F., and the oil and oxide mixture is heated up rapidly to that temperature, after which the heat may be discontinued to permit the reaction to proceed exothermically. The resin obtained is somewhat softer than that produced with the linseed and tung oil referred to above, but is still quite brittle, almost transparent, and of a clear brownish yellow color.

V. Corn oil may be utilized in producing a resin, handling the corn oil in substantially the same way as that set forth above for the castor or soya bean products. The mixture with magnesium oxide in the proportions indicated, is heated rapidly to a temperature of about 600° F. after which the external heat is discontinued, and the reaction permitted to proceed exothermically. A substantially straw colored product, tending to opaqueness and more gum-like in character is obtained with the corn oil, although the resin is still quite brittle and easily frangible.

The following example illustrates the utilization of fatty acids themselves in the production of resins in accordance with the present invention.

VI. Ricinoleic acid being the substantial acid from castor oil was utilized, utilizing for example 30 grams of magnesium oxide to the pound of castor acid, which is slightly less than the 1:14 ratio given above in producing the castor oil product. The mixture of materials was heated to about 540° F., when the reaction proceeded spontaneously. The reaction product in this instance is a light colored, rather straw yellow, practically transparent, brittle resin.

The reaction products produced in accordance with the present invention may generally be described as soluble in ordinary organic solvents, including alcohol and its derivatives, acetone, toluol, carbontetrachloride, benzene, turpentine, but not as soluble, and in some instance, insoluble in the hydrocarbon products of the character of gasoline, and kerosene.

The synthetic resins produced by the present invention have a tendency to bleach out when exposed to sunlight, and this is particularly true of the ricinoleic acid resin described above.

The various properties of these resins make them utilizable widely in lieu of synthetic and natural resins generally in the industries in the production of coating compositions, molding compositions, etc. These resins possess insulating properties, and may desirably be employed, therefore, in the production of articles used in electrical apparatus or systems, either employing the resins in solution form, applied as coatings on the articles to be thus protected, or in molding compositions to produce molded articles, where admixed with fillers, desirable articles may be produced.

Varnishes may be produced from these products by solution of the resins in the drying oil or other varnish type compositions, the resins being used in lieu of or together with other synthetic resins or natural resins as generally employed in the production of varnishes.

The resins themselves without inclusion of drying oils may be utilized in solution for coating compositions, thus, for example, the castor oil resin in solution in turpentine giving a substantially clear varnish. A varnish of castor or tung resins yields a floor filler of wax-like finish, that appears to improve with washing.

Generally the resins produced in accordance with the present invention are harder than natural resins and melt at higher temperatures than the natural resins, which property further makes them desirably employed in electrical equipment and installations. Thus a resin of either castor oil, tung oil or linseed oil may be utilized with lower quantities of magnesium oxide to oil. For example, slightly more than one-half of the amount of magnesium oxide given in the castor oil example above, to produce tough, dense or flexible stages that can be applied to coils to seal punctures therein as in spark coils and transformers of the high tension type.

The resins may be utilized as binders in producing non-shatterable glass, as for example, where two or more panes of glass are sandwiched together by means of a binder of the synthetic resins disclosed herein, or composition of the cellulose esters, such as nitrocellulose, together with the resins, may be employed. The bleaching out characteristic of the ricinoleic acid resin, for example, is particularly valuable for such purposes.

The resins of the present invention desirably may be employed as plasticizers in cellulose ester compositions or lacquers, particularly of the cellulose nitrate or cellulose acetate type. And these resins may be employed as plasticizers with cellulose nitrate or cellulose acetate, or other cellulose esters and ethers in producing various types of products including, for example, the cellulose acetate threads or yarns used in the production of fabrics and textiles.

These resins may be used in lieu of other resins, natural and synthetic, for the sizing of paper, and either by application in sizing compositions to the finished paper, or incorporated into the beater in the usual resin formulations before the paper composition is sheeted.

In view of the insulating properties of the resins, they may be utilized in solutions for application to metallic conductors or wires to produce insulating coatings thereon, or for the impregnation of the usual type of cotton or other coatings on such wires, or the wires may be run through the molten resin to produce a coating thereon. Solutions of the resins may also be employed as primer coats on metallic and wood surfaces, and particularly as undercoats over which drying oil types of varnishes are to be applied. They may, however, also be employed as undercoats under lacquers of the nitrocellulose, etc. type.

Coatings of these resins may be baked to increase their hardness.

The invention has been particularly illustrated above by the utilization of glyceride oils and their fatty acids, but mixtures of the glyceride oils, or mixtures of the fatty acids, or mixtures of the oils and acids may be employed in producing these reaction products; by the expression "glyceride oil component" occuring in the hereunto appended claims is intended any of these substances individually or in admixture. While the incorporation of other substances, particularly of organic character is not required in the production of these resins, the resins may be modified by the inclusion of other organic substances with the reaction mixture before the heat treatment is begun.

Mixtures of the resins of the present invention with other types of resins may be employed for particular purposes, and among such resins t may be utilized there may be mentioned the phenol-formaldehyde types of resins, the phthalic glyceride types of resins, the vinyl resins, the urea-formaldehyde types of resins, etc.

Having thus set forth my invention, I claim:

1. An exothermic heat reaction product of true resinous character from a glyceride oil and an oxide selected from the group consisting of the alkaline earth metal and and magnesium oxides in appropriate proportions of 1 part of oxide to 14 parts of oil by weight.

2. An exothermic heat reaction product of true resinous character from a semi-drying oil and an oxide selected from the group consisting of the alkaline earth metal and magnesium oxides in quantity sufficient to produce the indicated product.

3. An exothermic heat reaction product of true resinous character from a non-drying glyceride oil and an oxide selected from the group consisting of the alkaline earth metal and magnesium oxides in quantity sufficient to produce the indicated product.

4. The process of preparing reaction products which comprises heating a glyceride oil in the presence of an oxide selected from the group consisting of the alkaline earth metal and magnesium oxides, at elevated temperatures until gas in substantial amount is given off, and then permitting the reaction to continue exothermically until a reaction product of resinous character is obtained.

5. The process of preparing reaction products which comprises heating a drying oil in the presence of an oxide selected from the group consisting of the alkaline earth metal and magnesium oxides at elevated temperatures until gas in substantial amount is given off, and permitting the reaction to continue exothermically until a reaction product of resinous character is obtained.

6. The process of preparing reaction products which comprises heating a semi-drying glyceride oil in the presence of an oxide selected from the group consisting of the alkaline earth metal and magnesium oxides at elevated temperatures until gas in substantial amount is given off, and permitting the reaction to continue exothermically until a reaction product of resinous character is obtained.

7. The process of preparing reaction products which comprises heating a non-drying glyceride oil in the presence of an oxide selected from the group consisting of the alkaline earth metal and magnesium oxides, at elevated temperatures until gas in substantial amount is given off, and permitting the reaction to continue exothermically until a reaction product of resinous character is obtained.

8. The heat reaction product of true resinous character of magnesium oxide and a semi-drying oil in the proportions approximately of 1:14, said product being generally soluble in ordinary organic solvents, including alcohol and its derivatives, acetone, toluol, carbontetrachloride, benzene, and turpentine, but being generally insoluble or incompletely soluble in hydrocarbon products of the character of gasoline and kerosene.

9. The heat reaction product of true resinous character of magnesium oxide and a non-drying oil in the approximate proportions of 1:14, said product being generally soluble in ordinary organic solvents, including alcohol and its derivatives, acetone, toluol, carbontetrachloride, benzene, and turpentine, but being generally insoluble or incompletely soluble in hydrocarbon products of the character of gasoline and kerosene.

10. The process of producing reaction products which comprises heating a glyceride oil in the presence of a substantial quantity of magnesium oxide substantially free from carbonate to a temperature of at least 510° F. until a reaction product of resinous character is obtained.

11. The process of preparing reaction products which comprises heating a glyceride oil in the presence of magnesium oxide substantially free from carbonate in the ratio of 1 part of oxide to 14 parts of oil by weight at elevated temperatures until gas in substantial amount is given off, and permitting the reaction to continue exothermically until a reaction product of resinous character is obtained.

12. The process of preparing reaction products which comprises heating a glyceride oil in the presence of magnesium oxide substantially free from carbonate in the ratio of 1 part of oxide to 14 parts of oil by weight to a temperature of at least 510° F. until a reaction product of resinous character is obtained.

13. The method of controlling the conversion of a substance including a glyceride oil component into a product having the physical characteristics of a substance from the group consisting of resins, gums, balsams and pitches comprising heating the starting material in the presence of an oxide from the group consisting of alkaline earth metals and magnesium oxides in quantity sufficient to form the predetermined physical characteristics at a temperature which will generate an exothermic reaction and evolve substantial quantities of gas, and permitting the exothermic reaction to proceed, thereby forming a product having the desired characteristics dependent upon the quantity of alkaline earth or magnesium oxide used.

14. The method of producing a product of resinous character which comprises heating a substance including a glyceride oil component in the presence of sufficient oxide from the group consisting of alkaline earth metal and magnesium oxides to form a resinous product, at an elevated temperature sufficient to generate an exothermic reaction and evolve substantial quantities of gas, and permitting the exothermic reaction to proceed until a reaction product of resinous character is obtained.

15. The method as in claim 14, wherein the reagents are substantially free from carbonate and water.

16. The method as in claim 14, wherein air is excluded from the zone of reaction.

17. The method of producing a product of true resinous character which comprises heating a substance including a glyceride oil component in the presence of an excess of oxide from the group consisting of alkaline earth metal and magnesium oxide sufficient to form a truly resinous product, at an elevated temperature sufficient to generate an exothermic reaction and evolve substantial quantities of gas, permitting the exothermic reaction to proceed, and separating the excess oxide from the resin in its fluid state.

18. The method of producing a product of true resinous character which comprises heating a substance including a glyceride oil component in the presence of sufficient oxide from the group consisting of alkaline earth metal and magnesium oxide to form a truly resinous product and in the presence of a previously formed resinous reaction product resulting from this method, at an elevated temperature sufficient to generate an exothermic reaction and evolve substantial quantities of gas, and permitting the exothermic reaction to proceed until a reaction product of resinous character is obtained.

19. An exothermic heat reaction product of true resinous character from a substance from the group consisting of a non-drying glyceride oil and a semi-drying oil and an oxide selected from the group consisting of the alkaline earth metal and magnesium oxides in quantity sufficient to produce the indicated product.

RUDOLPH R. GRANT.